United States Patent
Pani et al.

(10) Patent No.: US 8,885,573 B2
(45) Date of Patent: Nov. 11, 2014

(54) METHOD AND APPARATUS FOR CONTROL OF COMMON CONTROL CHANNEL TRANSMISSION OVER COMMON ENHANCED DEDICATED CHANNEL RESOURCES IN CELL_FACH STATE

(75) Inventors: Diana Pani, Montreal (CA); Paul Marinier, Brossard (CA); Christopher R. Cave, Montreal (CA)

(73) Assignee: InterDigital Patent Holdings, Inc., Wilmington, DE (US)

( * ) Notice: Subject to any disclaimer, the term of this patent is extended or adjusted under 35 U.S.C. 154(b) by 1135 days.

(21) Appl. No.: 12/559,619

(22) Filed: Sep. 15, 2009

(65) Prior Publication Data

US 2010/0074203 A1   Mar. 25, 2010

Related U.S. Application Data

(60) Provisional application No. 61/097,055, filed on Sep. 15, 2008.

(51) Int. Cl.
  *H04W 4/00* (2009.01)
  *H04L 12/28* (2006.01)
  *H04W 60/02* (2009.01)
  *H04W 72/00* (2009.01)
  *H04W 8/26* (2009.01)

(52) U.S. Cl.
  CPC .............. *H04W 60/02* (2013.01); *H04W 72/00* (2013.01); *H04W 8/26* (2013.01)
  USPC .......................................... 370/329; 370/431

(58) Field of Classification Search
  CPC .......... H04W 74/0866; H04W 76/021; H04W 72/04; H04W 76/046; H04W 76/027; H04W 76/048; H04J 3/1682
  USPC .......................................... 370/329, 338, 431
  See application file for complete search history.

(56) References Cited

U.S. PATENT DOCUMENTS 6,961,570 B2   11/2005   Kuo et al.
7,756,087 B2   7/2010   Kim et al.
(Continued)

FOREIGN PATENT DOCUMENTS

CN   1921688 A   2/2007
CN   101146269 A   3/2008
(Continued)

OTHER PUBLICATIONS

Antipolis, "Specification of RRC procedure: Cell update", Ericsson—Agenda 14.2, Aug. 16-20, 1999.*
(Continued)

*Primary Examiner* — Hoang-Chuong Vu
(74) *Attorney, Agent, or Firm* — Condo Roccia Koptiw LLP

(57) ABSTRACT

A method and apparatus provide for the control of wireless communication signals over an enhanced dedicated channel (E-DCH) resource while operating in the CELL_FACH state with an allocated E-DCH radio network temporary identifier (E-RNTI). A determination is made that a periodic cell update timer is expired. In response to the periodic cell update timer expiring, a determination is made whether the WTRU has an allocated E-DCH resource. If the WTRU has an allocated E-DCH resource, the periodic cell update timer is re-started without performing a periodic cell update.

18 Claims, 13 Drawing Sheets

(56) References Cited

U.S. PATENT DOCUMENTS

| | | | | |
|---|---|---|---|---|
| 8,184,576 | B2* | 5/2012 | Lee et al. | 370/328 |
| 8,249,012 | B2* | 8/2012 | Ranta-Aho et al. | 370/329 |
| 8,446,859 | B2* | 5/2013 | Kim et al. | 370/328 |
| 2003/0207702 | A1* | 11/2003 | Chen | 455/574 |
| 2004/0203778 | A1* | 10/2004 | Kuo et al. | 455/436 |
| 2005/0141541 | A1* | 6/2005 | Cuny et al. | 370/437 |
| 2005/0265294 | A1* | 12/2005 | Hu et al. | 370/335 |
| 2005/0281222 | A1* | 12/2005 | Ranta-Aho et al. | 370/328 |
| 2008/0069280 | A1 | 3/2008 | Wang et al. | |
| 2008/0311932 | A1* | 12/2008 | Kuo | 455/458 |
| 2009/0135769 | A1* | 5/2009 | Sambhwani et al. | 370/329 |
| 2009/0185528 | A1* | 7/2009 | Sambhwani et al. | 370/329 |
| 2009/0196230 | A1* | 8/2009 | Kim et al. | 370/329 |
| 2009/0247161 | A1* | 10/2009 | Pani et al. | 455/435.3 |
| 2011/0194433 | A1* | 8/2011 | Song et al. | 370/252 |
| 2012/0021779 | A1* | 1/2012 | Kuo | 455/458 |
| 2012/0026982 | A1 | 2/2012 | Kuo et al. | |

FOREIGN PATENT DOCUMENTS

| | | |
|---|---|---|
| JP | 2004-159297 A | 6/2004 |
| JP | 2008-199615 A | 8/2008 |
| JP | 2010-504023 A | 2/2010 |
| KR | 20080028486 A | 3/2008 |
| RU | 2305371 C2 | 8/2007 |
| WO | WO2007027526 A2 | 3/2007 |
| WO | WO 2008/033072 A1 | 3/2008 |
| WO | WO2008097489 A2 | 8/2008 |

OTHER PUBLICATIONS

Nokia Corporation et al., "Introduction of Uplink Enhanced CELL_FACH in 25.321 (Draft CR)," 3GPP TSG-RAN WG2 Meeting #62, R2-082371 (May 2008).

Nokia Corporation et al., "Proposals with and Comments on a Draft 25.331 CR," 3GPP TSG-RAN WG2 Meeting #62, R2-082374 (May 2008).

Rapporteur et al., "Enhanced Uplink for CELL_FACH State in FDD," TSG-RAN meeting #39, RP-080046 (Mar. 2008).

Rapporteur et al., "Enhanced Uplink for CELL_FACH State in FDD," TSG-RAN meeting #40, RP-080266 (May 2008).

Third Generation Partnership Project, "Technical Specification Group Radio Access Network; Radio Resource Control (RRC); Protocol Specification (Release 8)," 3GPP TS 25.331 V8.7.0 (Jun. 2009).

Third Generation Partnership Project, "Technical Specification Group Radio Access Network; Radio Resource Control (RRC); Protocol Specification (Release 8)," 3GPP TS 25.331 V8.3.1 (Aug. 2008).

Third Generation Partnership Project, "Technical Specification Group Radio Access Network; Enhanced uplink; Overall description; Stage 2 (Release 8)," 3GPP TS 25.319 V8.2.0 (May 2008).

Third Generation Partnership Project, "Technical Specification Group Radio Access Network; Enhanced uplink; Overall description; Stage 2 (Release 8)," 3GPP TS 25.319 V8.6.0 (Jun. 2009).

Third Generation Partnership Project, "Technical Specification Group Radio Access Network; Enhanced uplink; Overall description; Stage 2 (Release 9)," 3GPP TS 25.319 V9.0.0 (Jun. 2009).

3rd Generation Partnership Project (3GPP), R2-080996, "On Mobility", Nokia Siemens Networks, Enhanced Uplink for CELL_FACH state, TSG-RAN WG2 Meeting #61, Sorrento, Italy, Feb. 11-15, 2008, 3 pages.

3rd Generation Partnership Project (3GPP), R2-082579, "On E-DCH Resource Release" Nokia Siemens Networks, 3GPP TSG-RAN WG2 Meeting #62, Kansas City, USA, May 5-9, 2008, 10 pages.

3rd Generation Partnership Project (3GPP), R2-082592, "Implicit Release of Common E-DCH Resource in CELL_FACH", Qualcomm Europe, 3GPP TSG-RAN WG2 #62, Kansas City, USA, May 5-9, 2008, 1-2.

3rd Generation Partnership Project (3GPP), R2-083377, "Cell Reselection in Enhanced CELL_FACH State for LCR TDD", CATT, 3GPP TSG-RAN WG2 #62bis, Warsaw, Poland, Jun. 30-Jul. 4, 2008, 1-4.

3rd Generation Partnership Project (3GPP), R2-084067, "Introduction of Enhanced Uplink in CELL_FACH State and Idle Mode in 25.321", Nokia Siemens Networks, 3GPP TSG-RAN WG2 Meeting #63, Jeju, Korea, Aug. 18-22, 2008, 44 pages.

3rd Generation Partnership Project (3GPP), R2-085308, "Resetting the Periodic Cell Update Timer T305 After Autonomous State Transition to CELL_FACH", InterDigital, Nokia Corporation, Nokia Siemens Networks, 3GPP TSG-RAN WG2 Meeting #63bis, Prague, Czech Republic, Sep. 29-Oct. 3, 2008, 1-3.

* cited by examiner

METHOD AND APPARATUS FOR CONTROL OF COMMON CONTROL CHANNEL TRANSMISSION OVER COMMON ENHANCED DEDICATED CHANNEL RESOURCES IN CELL_FACH STATE

CROSS REFERENCE TO RELATED APPLICATIONS

This application claims the benefit of U.S. Provisional Application No. 61/097,055 filed Sep. 15, 2008, which is incorporated by reference as if fully set forth herein.

FIELD OF INVENTION

This application is related to wireless communications.

BACKGROUND

FIG. 1 shows radio resource control (RRC) service states 100 of a Third Generation Partnership Project (3GPP) wireless transmit/receive unit (WTRU) with an enhanced uplink in a Universal Mobile Telecommunications System (UMTS). The WTRU may operate in several states depending on user activity. The following states have been defined for UMTS Terrestrial Radio Access (UTRA) radio resource control (RRC) connected mode: IDLE 110, CELL_DCH 120, CELL_FACH 130, URA_PCH 140, and CELL_PCH 150. Other states that the WTRU may transition to include a general packet radio service (GPRS) packet transfer mode 160, a global system for mobile communications (GSM) connected mode 170, or an enhanced UTRA (E-UTRA) connected mode 180. RRC state transitions may be controlled by the network using radio network controller (RNC) parameters.

As part of the work effort for 3GPP Release 8, it has been proposed to allow a WTRU that is in the CELL_FACH state or in idle mode to use an enhanced random access channel (E-RACH) mechanism, whereby the WTRU uses enhanced dedicated channel (E-DCH) resources in the uplink (UL). The E-DCH resources are taken from a small pool of common resources that are shared among other 3GPP Release 8 CELL_FACH WTRUs. These WTRUs request E-DCH resources using the legacy random access channel (RACH) ramp up procedure. As part of this ramp up procedure, the WTRU transmits a randomly selected signature sequence, or a preamble signature, in a randomly selected access slot. If the signature is correctly decoded, a Node-B responds with an E-DCH resource assignment from its pool of resources, and the details are signaled to the WTRUs through the broadcast system information. In assigning the E-DCH resource, the Node-B needs only signal an index as to which E-DCH resource to use. The index is signaled over an acquisition indicator channel (AICH) or over an evolved AICH (E-AICH). Upon reception of the E-DCH resource index, the WTRU is configured with the E-DCH resource and may start transmitting UL data over the E-DCH.

A common E-DCH resource may be used by WTRUs that are in idle mode, CELL_FACH state, CELL_PCH state, or URA_PCH state. A WTRU in the CELL_FACH state may transmit common control channel (CCCH) traffic or dedicated control channel/dedicated traffic channel (DCCH/DTCH) traffic over the common E-DCH resource. If the WTRU has an E-DCH radio network temporary identifier (E-RNTI) allocated, the DCCH/DTCH data transmission over an assigned E-DCH resource starts with a contention resolution phase. During the contention resolution phase, the WTRU's E-RNTI is included in all the medium access control (MAC)-i protocol data units (PDUs). With the reception of the WTRU's E-RNTI, the network (e.g., Universal Mobile Telecommunications System Terrestrial Radio Access Network or UTRAN) is informed of which WTRU was granted the E-DCH resource and the Node-B may send an enhanced access grant channel (E-AGCH) signal confirming the WTRU's E-RNTI (through an E-RNTI specific cyclic redundancy check (CRC) attachment). If the WTRU does not receive its E-RNTI on the E-AGCH upon the expiration of a timer, then the contention has not been resolved and the WTRU releases the associated E-DCH resources.

If the WTRU has CCCH data to transmit, no contention resolution phase is performed. The WTRU has a maximum CCCH allocation time to transmit the data. When the time expires the resources are released.

The E-DCH resources may also be released due to the reception of the value "inactive" on E-AGCH; due to a radio link failure; due to total E-DCH buffer status (TEBS) equal to zero; or due to the expiration of an inactivity timer.

When a WTRU transmits CCCH traffic, the underlying assumption is that it will not have an allocated E-RNTI and will not perform contention resolution. Although this is the case for CELL UPDATE messages after a cell selection/reselection and for RRC CONNECTION REQUEST messages, situations exist where a WTRU has an E-RNTI and must transmit the CCCH traffic (e.g., a periodic cell update message). For such cases, WTRU behavior becomes ambiguous. According to current specifications, if an E-RNTI is allocated, the WTRU is required to add its E-RNTI to all MAC-i PDUs until the contention resolution is resolved (i.e., when the WTRU receives an E-AGCH with its E-RNTI). However, a WTRU that is transmitting CCCH traffic is not required to perform contention resolution and is not required to monitor the E-AGCH. Contention resolution may not be required for CCCH traffic, such as a periodic cell update message, since the periodic cell update message is anticipated to be small in size. Based on this assumption, on the network side, it is specified that when the WTRU E-RNTI is present, it identifies DCCH/DTCH data transmission from this WTRU, however, this assumption may not be correct, especially when an E-RNTI is present with CCCH data transmission.

Methods to handle the above described scenario are not defined and apparent. More specifically, the WTRU needs to handle the situation where a WTRU has common E-DCH resources allocated and is already sending DCCH/DTCH traffic when a periodic cell update is triggered. The WTRU also needs to handle the situation where a WTRU is already transmitting CCCH traffic with an E-RNTI allocated when DCCH/DTCH data becomes available for transmission.

SUMMARY

A method and apparatus is disclosed for control of wireless communication signals over an enhanced dedicated channel (E-DCH) resource while operating in the CELL_FACH state with an allocated E-DCH radio network temporary identifier (E-RNTI). A determination is made that a periodic cell update timer is expired. In response to the periodic cell update timer expiring, a determination is made whether the WTRU has an allocated E-DCH resource. If the WTRU has an allocated E-DCH resource, the periodic cell update timer is re-started without performing a periodic cell update.

BRIEF DESCRIPTION OF THE DRAWINGS

A more detailed understanding may be had from the following description, given by way of example in conjunction with the accompanying drawings wherein.

DETAILED DESCRIPTION

When referred to hereafter, the terminology "wireless transmit/receive unit (WTRU)" includes but is not limited to a user equipment (UE), a mobile station, a fixed or mobile subscriber unit, a pager, a cellular telephone, a personal digital assistant (PDA), a computer, or any other type of user device capable of operating in a wireless environment. When referred to hereafter, the terminology "base station" includes but is not limited to a Node-B, a site controller, an access point (AP), or any other type of interfacing device capable of operating in a wireless environment.

Figure 1:
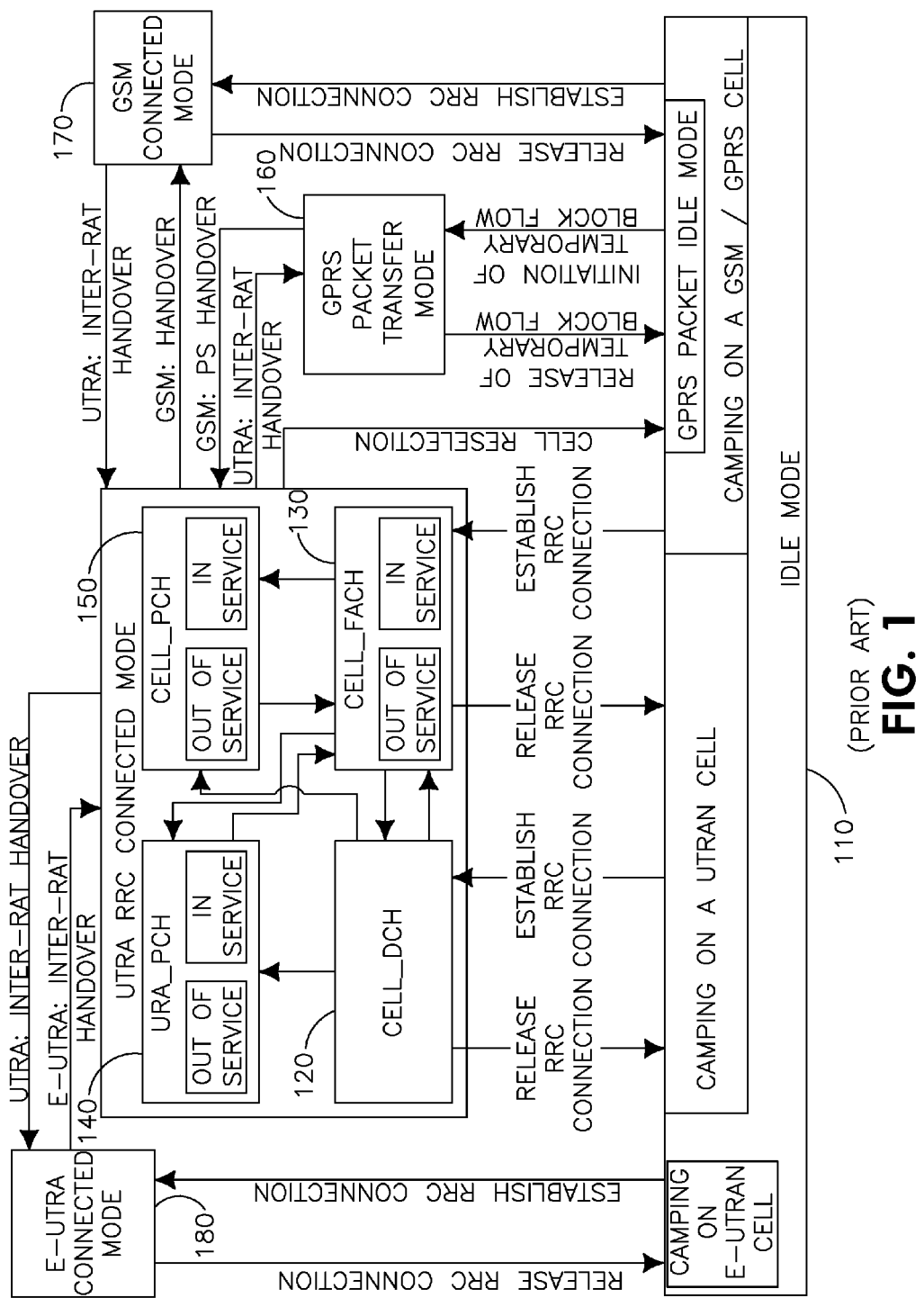
FIG. 1 shows the RRC states with high speed downlink packet access (HSDPA)/high speed uplink packet access (HSUPA)
Figure 2:
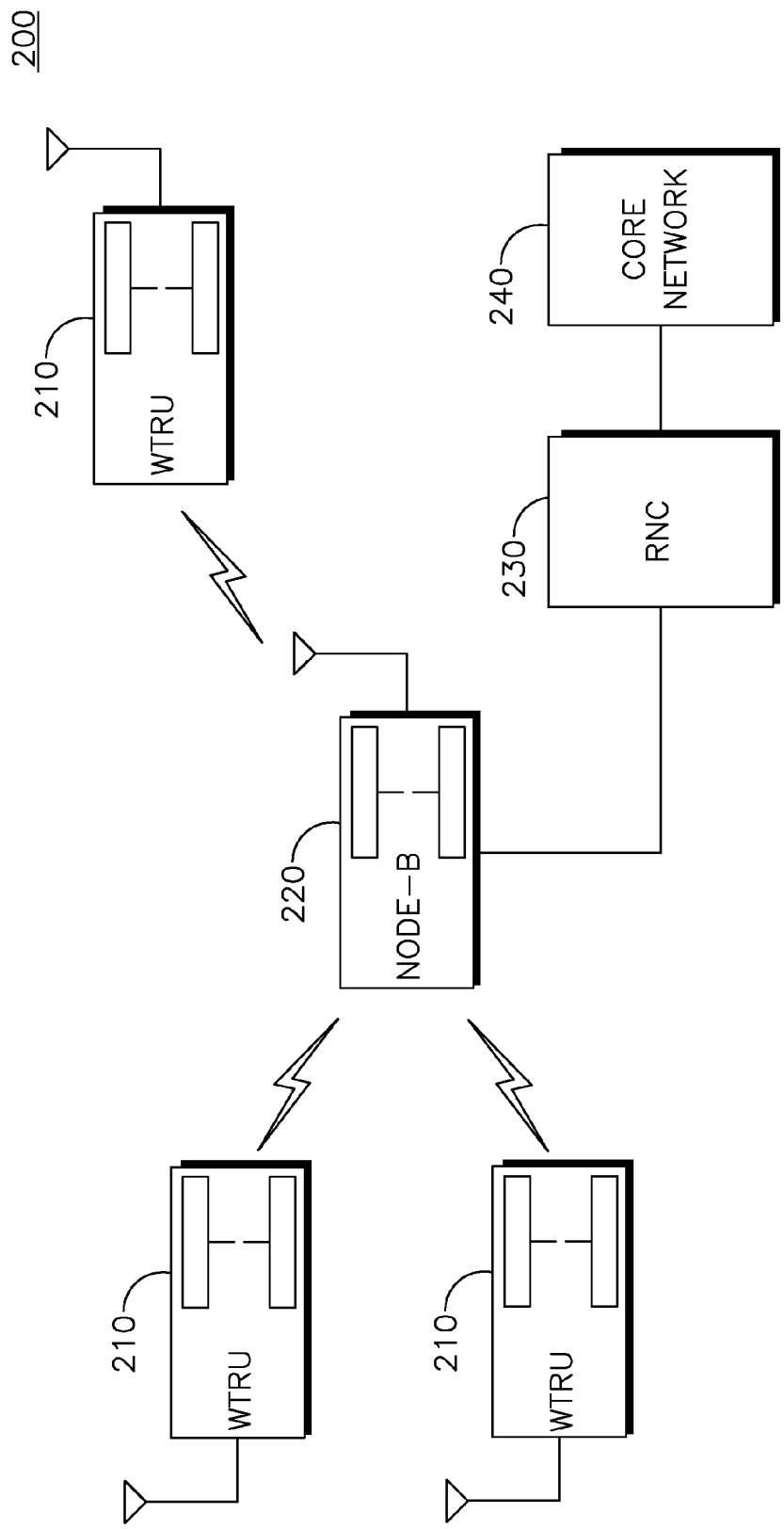
FIG. 2 is an example of a wireless communication system including a plurality of wireless transmit/receive units (WTRUs), a Node-B, a radio network controller (RNC), and a core network.

FIG. 2 shows a wireless communication system 200 including a plurality of WTRUs 210, a Node-B 220, an RNC 230, and a core network 240. As shown in FIG. 2, the WTRUs 210 are in communication with the Node-B 220, which is in communication with the RNC 230, which is in communication with the core network 240. Although three WTRUs 210, one Node-B 220, and one RNC 230 are shown in FIG. 2, it should be noted that any combination of wireless and wired devices may be included in the wireless communication system 200.

Figure 3:
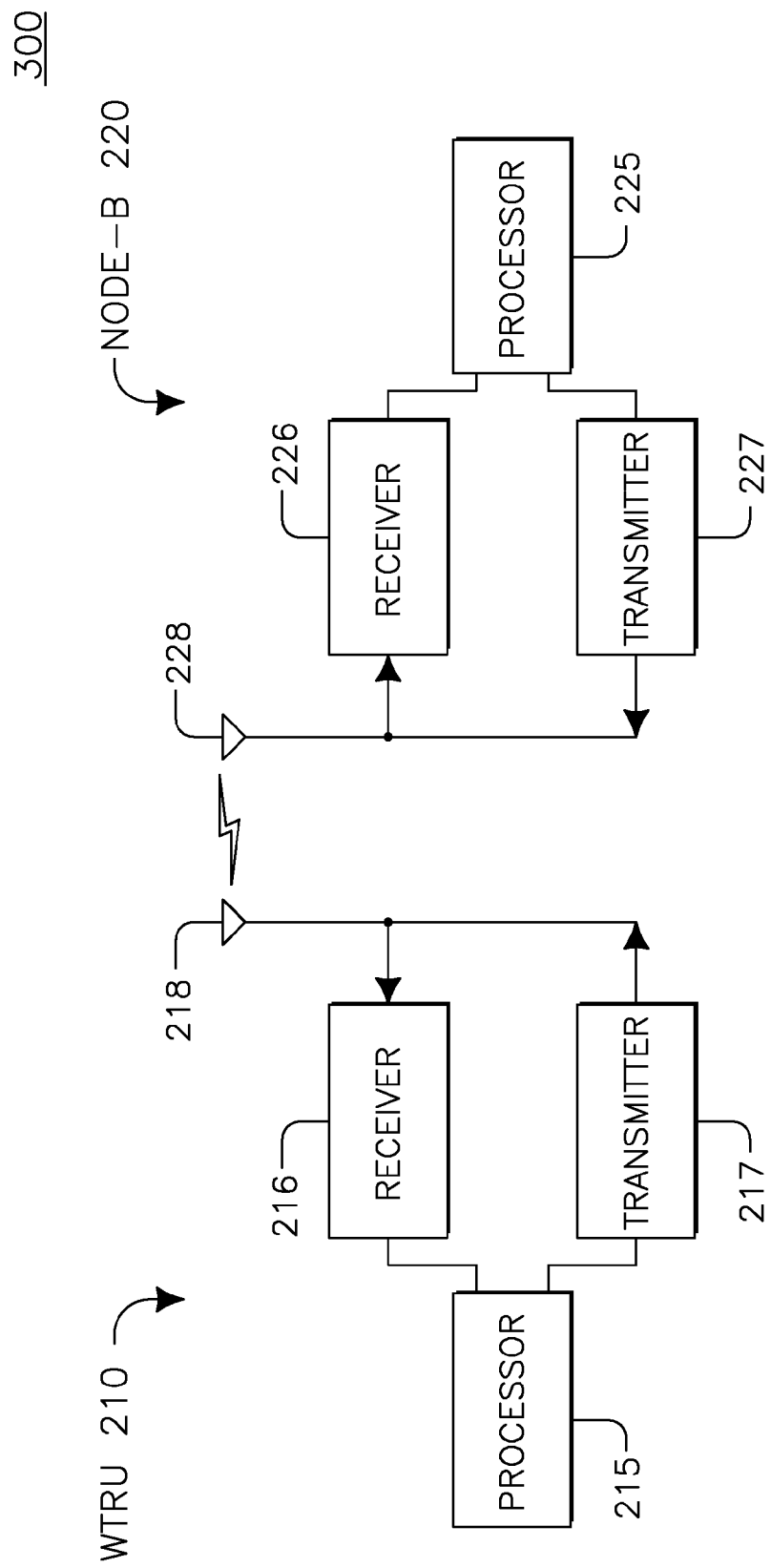
FIG. 3 is a functional block diagram of a WTRU and the Node-B of FIG. 2.

FIG. 3 is a functional block diagram 300 of a WTRU 210 and the Node-B 220 of the wireless communication system 200 of FIG. 2. As shown in FIG. 3, the WTRU 210 is in communication with the Node-B 220 and the WTRU 210 is configured to perform a method for control of CCCH transmission over common E-DCH resources in the CELL_FACH state.

In addition to the components that may be found in a typical WTRU, the WTRU 210 includes a processor 215, a receiver 216, a transmitter 217, and an antenna 218. The processor 215 is configured to perform a method for control of CCCH transmission over common E-DCH resources in the CELL_FACH state. The receiver 216 and the transmitter 217 are in communication with the processor 215. The antenna 218 is in communication with both the receiver 216 and the transmitter 217 to facilitate the transmission and reception of wireless data. Although one WTRU 210 antenna 218 is shown in FIG. 3, it should be noted that more than one antenna may be included in the WTRU 210.

In addition to the components that may be found in a typical Node-B, the Node-B 220 includes a processor 225, a receiver 226, a transmitter 227, and an antenna 228. The processor 225 is configured to perform a method for control of CCCH transmission over common E-DCH resources in the CELL_FACH state. The receiver 226 and the transmitter 227 are in communication with the processor 225. The antenna 228 is in communication with both the receiver 226 and the transmitter 227 to facilitate the transmission and reception of wireless data. Although one antenna 228 is shown in FIG. 3, it should be noted that more than one antenna may be included in the Node-B 220.

The network may implicitly detect that a WTRU 210 is still connected if the WTRU 210 has ongoing DCCH/DTCH traffic (i.e. has an allocated common E-DCH resource for DCCH/DTCH traffic), and therefore, a periodic cell update may not be needed. The WTRU 210 may skip (i.e. not perform) a periodic cell update or prevent a periodic cell update from occurring if it has an allocated common E-DCH resource for DCCH/DTCH traffic.

Figure 4:
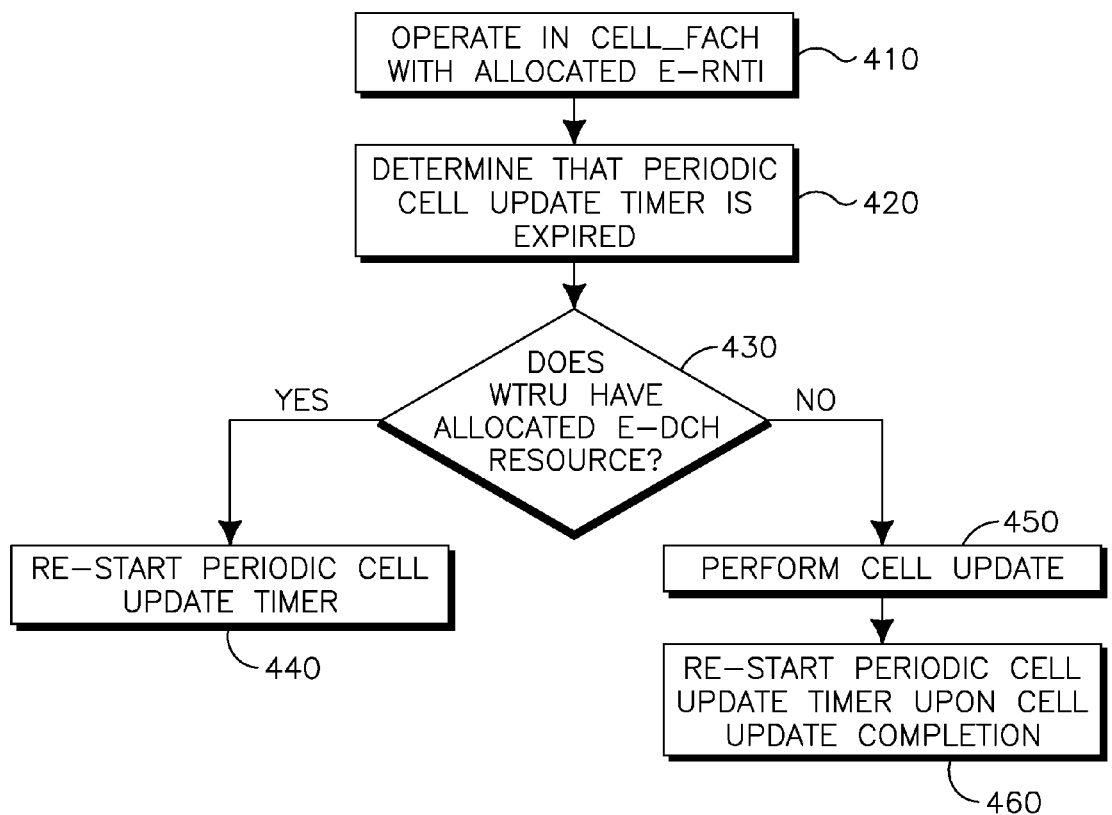
FIG. 4 shows a flow diagram of a WTRU that does not perform (i.e. skips) a periodic cell update when a periodic cell update is triggered and the WTRU has an allocated E-DCH resource.

FIG. 4 shows a flow diagram of a WTRU 210 that does not perform (i.e. skips) a periodic cell update when a periodic cell update is triggered and the WTRU 210 has an allocated E-DCH resource. The WTRU 210 may be operating in the CELL_FACH state with an allocated E-RNTI (410). The WTRU 210 determines that a periodic cell update timer is expired (420). The periodic cell update timer may be a T305 timer. The WTRU 210 determines whether it has an E-DCH resource allocated (430). The E-DCH resource may be a common E-DCH resource for DCCH/DTCH traffic. On a condition that the WTRU 210 has an E-DCH resource allocated, the WTRU 210 re-starts the periodic cell update timer (440), which allows the WTRU 210 to skip the periodic cell update. The WTRU 210 may re-start the periodic cell update timer immediately or upon the release of E-DCH resources. On a condition that the WTRU 210 does not have an allocated E-DCH resource, the WTRU 210 may perform a cell update procedure (450), where CCCH data may be transmitted. In response to performing the cell update, the WTRU 210 may not allow transmission of DCCH/DTCH traffic until CCCH resources are released. Once the cell update procedure is complete, the WTRU 210 may re-start the periodic cell update timer (460).

Figure 5:
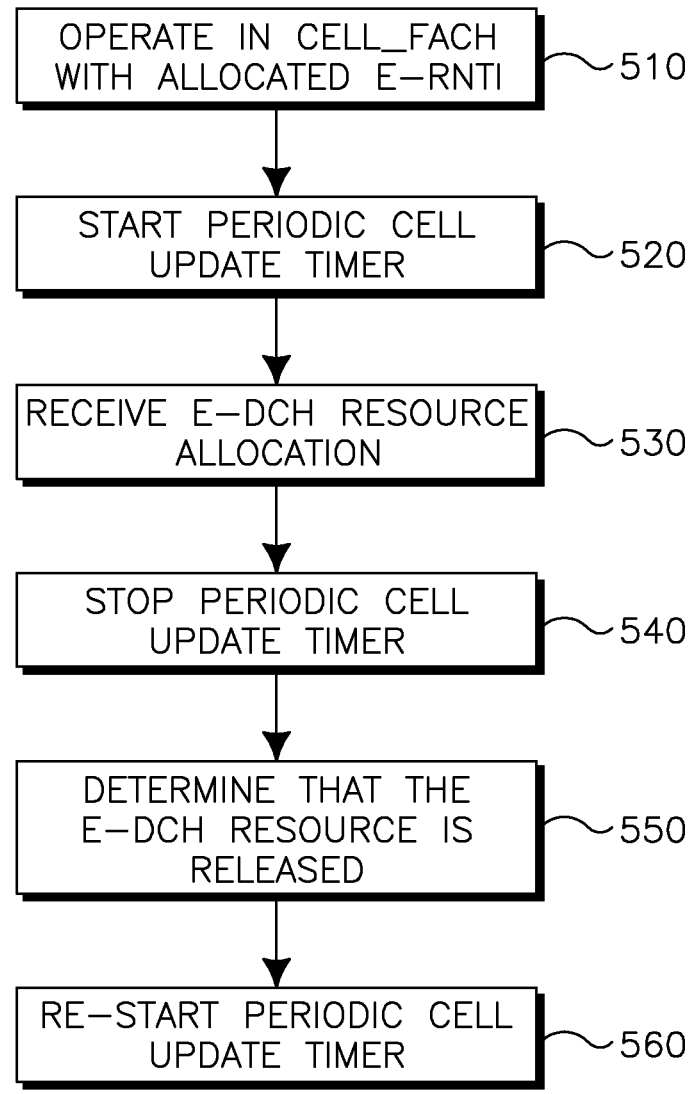
FIG. 5 shows a flow diagram of a WTRU that prevents a periodic cell update if the WTRU has an allocated E-DCH resource.

FIG. 5 shows a flow diagram of a WTRU 210 that prevents a periodic cell update if the WTRU 210 has an allocated E-DCH resource. The WTRU 210 may be operating in the CELL_FACH state with an allocated E-RNTI (510). The WTRU 210 may start a periodic cell update timer (520). The periodic cell update timer may be a T305 timer. The WTRU 210 receives an E-DCH resource allocation (530). For example, the WTRU 210 may receive "E-DCH resource index". The WTRU 210 may also receive an E-DCH resource allocation after a contention resolution phase is resolved. The WTRU 210 may also receive an E-DCH resource allocation after the transmission of a first successful data (i.e. when the WTRU 210 receives a hybrid automatic repeat request (HARQ) acknowledgement (ACK) or alternatively a radio link control (RLC) ACK). The E-DCH resource may be a common E-DCH resource for DCCH/DTCH traffic. When the WTRU 210 receives a common E-DCH resource allocation, it may set a variable COMMON_E-DCH_TRANSMISSION to true. The WTRU 210 may stop the periodic cell update timer (540) once the E-DCH resource allocation is received. The WTRU 210 determines that the E-DCH resource is released (550). The WTRU 210 may re-start the periodic cell update timer (560) once the E-DCH resource is released.

The WTRU 210 may be configured to re-start the periodic cell update timer in response to E-DCH resources being released under the following conditions: if the radio resource control (RRC) in the WTRU 210 received the "Enhanced Uplink in CELL_FACH and Idle mode process termination" by the medium access control (MAC) with the CMAC-STATUS primitive; or if the WTRU 210 failed to establish the physical channels; or if the criteria for radio link failure are met; then set the variable COMMON_E_DCH_TRANSMISSION to FALSE and (re)-start periodic cell update timer. The periodic cell update timer may be a T305 timer.

Physical channel establishment failure may occur when a physical dedicated channel establishment is initiated by the WTRU 210, the WTRU 210 shall initialize a timer and wait for layer 1 to indicate "in sync" indications. The timer may be a T312 timer. On receiving "in sync" indications, the physical channel is considered established and the timer T312 is stopped and reset. If the timer T312 expires before the physical channel is established, the WTRU 210 shall consider this as a "physical channel failure".

Radio link failure may occur when the WTRU 210 is in the CELL_DCH state and after receiving a number of consecutive "out of sync" indications from layer 1 for the established dedicated physical control channel (DPCCH) or fractional dedicated physical channel (F-DPCH) in frequency division duplex (FDD), and the physical channels associated with mapped DCCHs in time division duplex (TDD), the WTRU 210 shall initialize a timer, and upon receiving a number of successive "in sync" indications from layer 1 and upon change of WTRU 210 state, the timer is stopped and reset. The timer may be a T313 timer. If the timer T313 expires, then the WTRU 210 considers it as a radio link failure.

As an alternative, the periodic cell update timer is not stopped when the WTRU 210 has an allocated E-DCH resource in the CELL_FACH state, wherein the E-DCH resource may be a common E-DCH resource for DCCH/DTCH traffic.

Figure 6:
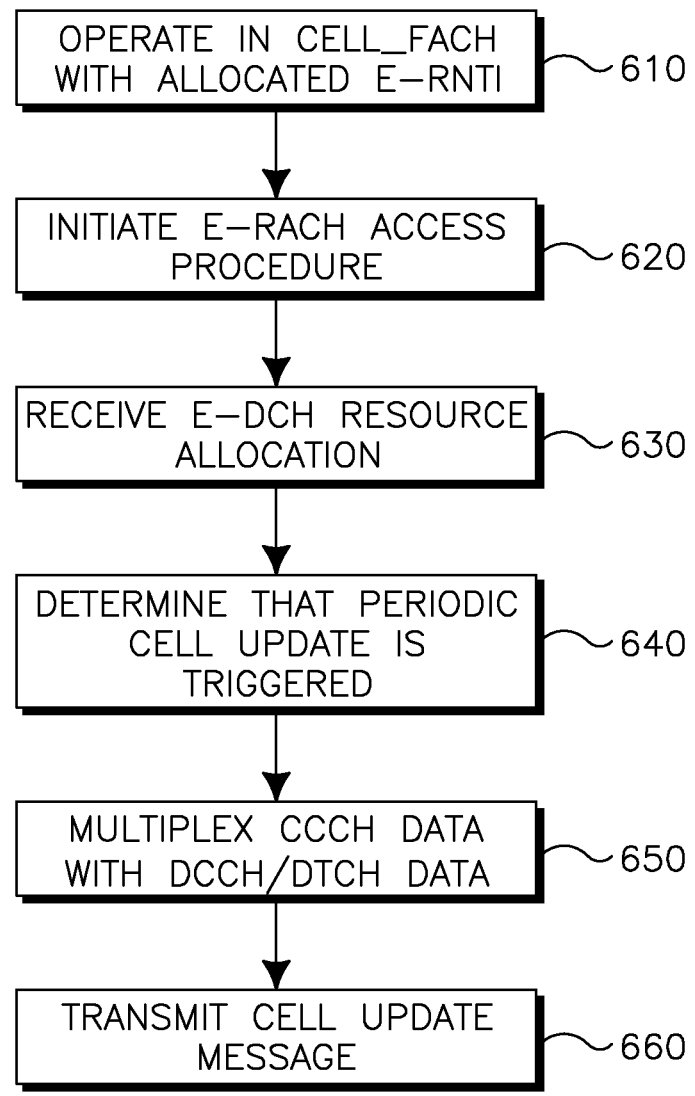
FIG. 6 shows a flow diagram of a WTRU that multiplexes CCCH data with DCCH/DTCH data when the WTRU has an allocated E-DCH resource and a periodic cell update is triggered.

FIG. 6 shows a flow diagram of a WTRU 210 that multiplexes CCCH data with DCCH/DTCH data when the WTRU 210 has an allocated E-DCH resource and a periodic cell update is triggered. The WTRU 210 may be operating in the CELL_FACH state with an allocated E-RNTI (610). The WTRU 210 may initiate an E-RACH access procedure (620). The WTRU 210 may receive an E-DCH resource allocation (630). The E-DCH resource may be a common E-DCH resource for DCCH/DTCH traffic. The WTRU 210 determines that a periodic cell update is triggered (640). In response to the determination that the periodic cell update is triggered, the WTRU 210 may continue with the E-RACH access procedure and may multiplex CCCH data with DCCH/DTCH data in a same transmit time interval (TTI) (650) and transmit a cell update message (660).

Alternatively, the WTRU 210 may be restricted from multiplexing CCCH data with DCCH/DTCH data in the same TTI. A determination of whether the WTRU 210 may multiplex the CCCH data with the DCCH/DTCH data in the same TTI may be preconfigured in the WTRU 210 or may be signaled as part of a MAC-d flow configuration for the CCCH. Optionally, CCCH transmission may be given a higher priority than DCCH/DTCH data transmission.

Figure 7:
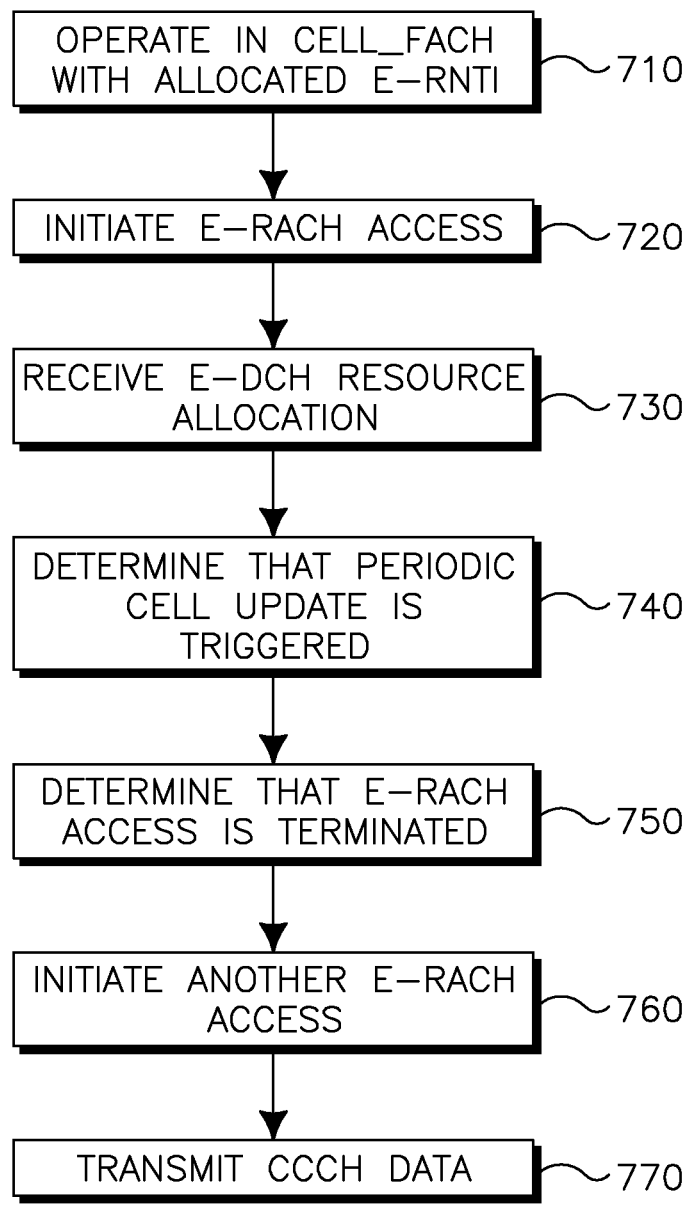
FIG. 7 shows a flow diagram of a WTRU that initiates another E-RACH access to send CCCH data when the WTRU has an allocated E-DCH resource and a periodic cell update is triggered.

FIG. 7 shows a flow diagram of a WTRU 210 that initiates another E-RACH access to send CCCH data when the WTRU 210 has an allocated E-DCH resource and a periodic cell update is triggered. The WTRU 210 may be operating in the CELL_FACH state with an allocated E-RNTI (710). The WTRU 210 may initiate an E-RACH access procedure (720). The WTRU 210 may receive an E-DCH resource allocation (730). The E-DCH resource may be a common E-DCH resource for DCCH/DTCH traffic. The WTRU 210 determines that a periodic cell update is triggered (740). The WTRU 210 may be restricted from sending CCCH data on the same E-RACH access opportunity as DCCH/DTCH data and may wait until the ongoing E-RACH access is terminated based on a cell update trigger. A cell update trigger may occur upon the expiration of a periodic cell update timer, or upon reselection to a new cell. The WTRU 210 determines that the ongoing E-RACH access is terminated (750). Once the E-RACH access is terminated, the WTRU 210 may initiate another E-RACH access (760), where the WTRU 210 may transmit CCCH data (770). The CCCH data may be a periodic cell update message.

Figure 8:
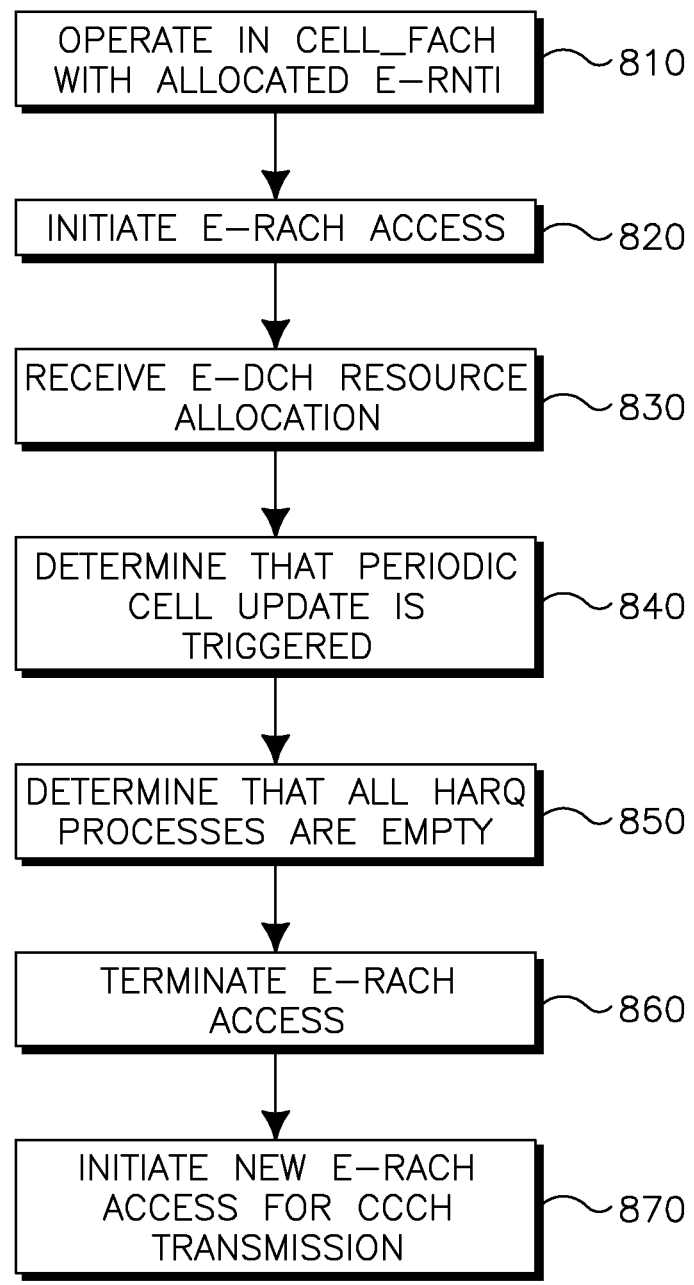
FIG. 8 shows a flow diagram of a WTRU that has an allocated E-DCH resource and waits for all HARQ processes to be emptied before initiating a new E-RACH access to transmit CCCH data.

FIG. 8 shows a flow diagram of a WTRU 210 that has an allocated E-DCH resource and waits for all HARQ processes to be emptied before initiating a new E-RACH access to transmit CCCH data. The WTRU 210 may be operating in the CELL_FACH state with an allocated E-RNTI (810). The WTRU 210 may initiate an E-RACH access procedure (820). The WTRU 210 may receive an E-DCH resource allocation (830). The E-DCH resource may be a common E-DCH resource for DCCH/DTCH traffic. The WTRU 210 determines that a periodic cell update is triggered (840). The WTRU 210 determines that all HARQ processes are empty (850). Once all HARQ processes are empty, the WTRU 210 may terminate the ongoing E-RACH access procedure (860). Optionally, the WTRU 210 may terminate the ongoing E-RACH access as soon as segmentation entities are emptied. Optionally, the WTRU 210 may terminate the ongoing E-RACH access as soon as both the HARQ processes and the segmentation entities are emptied. The WTRU 210 may initiate a new E-RACH access procedure for CCCH transmission (870). The CCCH transmission may contain a periodic cell update message.

Figure 9:
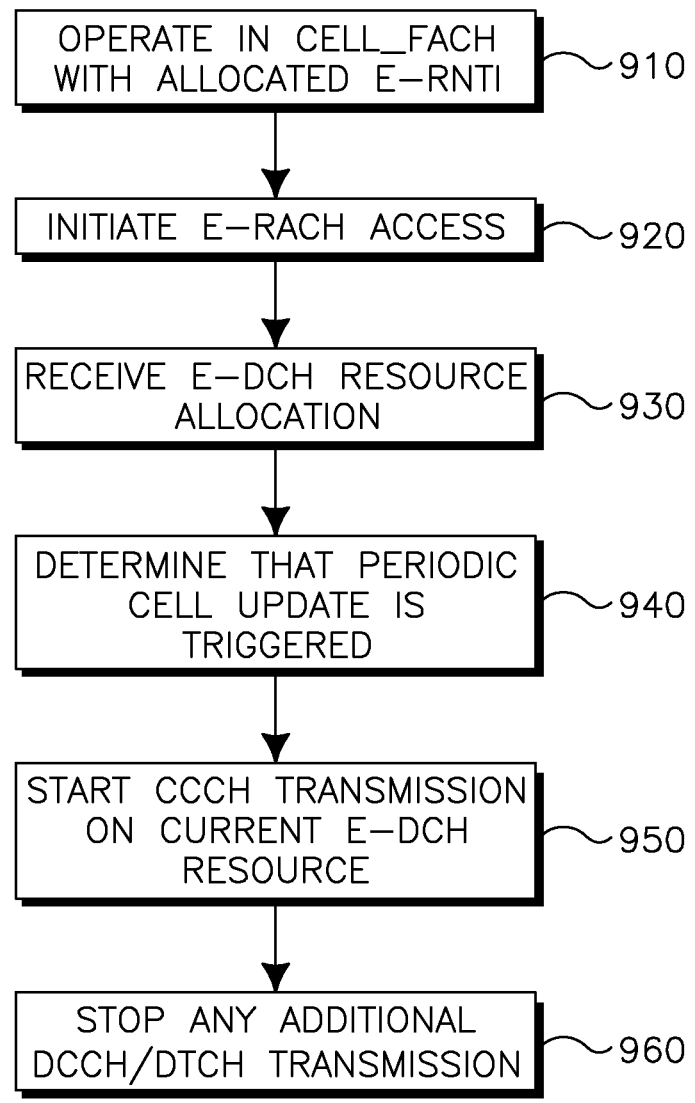
FIG. 9 shows a flow diagram of a WTRU that starts CCCH transmission on a current E-DCH resource when the WTRU has an allocated E-DCH resource and a periodic cell update is triggered.

FIG. 9 shows a flow diagram of a WTRU 210 that starts CCCH transmission on a current E-DCH resource when the WTRU 210 has an allocated E-DCH resource and a periodic cell update is triggered. The WTRU 210 may be operating in the CELL_FACH state with an allocated E-RNTI (910). The WTRU 210 may start an E-RACH access procedure (920). The WTRU 210 may receive an E-DCH resource allocation (930). The E-DCH resource may be a common E-DCH resource for DCCH/DTCH traffic. The WTRU 210 determines that a periodic cell update is triggered (940). The WTRU 210 may begin CCCH transmission on the current E-DCH resource (950). The CCCH transmission may contain a periodic cell update message. The WTRU 210 may stop any additional DCCH/DTCH transmission (960). More specifically, the MAC and the RLC may stop delivering DCCH/DTCH data to the physical layer. Optionally, the WTRU 210 may stop any timers associated with DCCH/DTCH data delivery (i.e. contention resolution timer) and start a CCCH maximum resolution timer.

There may be situations where the WTRU 210 starts transmitting a CCCH message without performing contention resolution even though it has an allocated E-RNTI. While CCCH transmission is still ongoing, DCCH/DTCH data becomes available for transmission. Since the WTRU 210 has not performed contention resolution, it may not be preferable to allow the WTRU 210 to transmit the DCCH/DTCH data during the same E-RACH access as the CCCH data.

Figure 10:
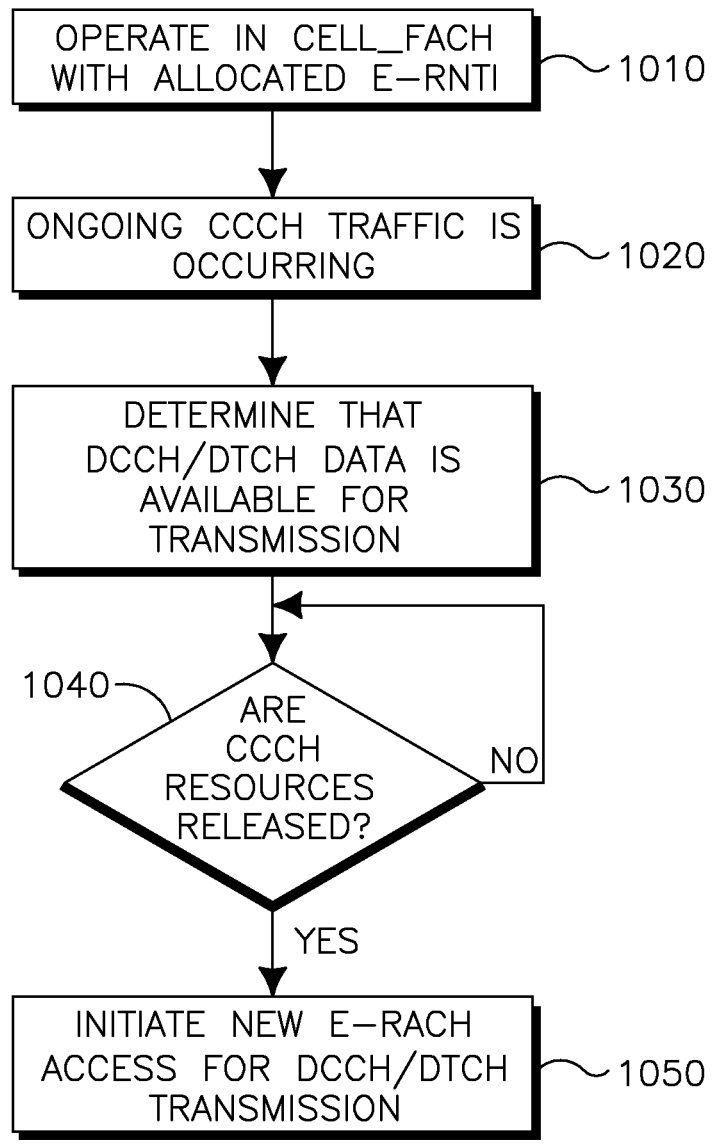
FIG. 10 shows a flow diagram of a WTRU that does not allow DCCH/DTCH data to be transmitted if E-DCH resources are allocated for CCCH transmission.

FIG. 10 shows a flow diagram of a WTRU 210 that does not allow DCCH/DTCH data to be transmitted if E-DCH resources are allocated for CCCH transmission. More specifically, the WTRU 210 waits for CCCH resources to be released before initiating another E-RACH access to transmit DCCH/DTCH data. The WTRU 210 may be operating in the CELL_FACH state with an allocated E-RNTI (1010). The WTRU 210 may have ongoing CCCH traffic (i.e. an allocated common E-DCH resource for CCCH traffic) (1020). The WTRU 210 determines that DCCH/DTCH data is available for transmission (1030). The WTRU 210 determines whether CCCH resources are released, and may be configured to wait until the CCCH resources are released before transmitting DCCH/DTCH traffic (1040). The CCCH resources may be released if a maximum allocation time expires. The CCCH resources may also be released if the WTRU 210 does not have any more CCCH data to transmit (i.e. the WTRU 210 sends a scheduling information message indicating its TEBS is equal to zero). Once the CCCH resources are released, the WTRU 210, and more specifically the RLC and MAC, may be allowed to initiate a new E-RACH access procedure to transmit DCCH/DTCH traffic (i.e. contention resolution is initiated) (1050). In order to implement this restriction, the MAC layer may not request data from any other logical channels until CCCH transmission and E-RACH access has been terminated. Alternatively, the RLC may buffer the DCCH/DTCH data and not send any data to lower layers until the E-RACH access has been terminated.

The release of CCCH resources may not occur based on the TEBS equal to zero, if there is DCCH/DTCH data in the buffer, since the TEBS will not be equal to zero. In order to initiate the release of E-DCH resources, the WTRU 210 may be configured to determine whether the buffer status for CCCH data is empty, or alternatively whether a CCCH PDU has been transmitted, rather than determining whether a total RLC buffer status is equal to zero. Upon a determination that the CCCH data buffer is empty, the WTRU 210 may be configured to trigger the transmission of a scheduling information message and release the resources once the PDU containing the scheduling information message has been successfully transmitted or the number of retransmissions have been exceeded. Additionally, the WTRU 210 may be configured to set the TEBS equal to zero in the scheduling information message upon a determination that no more CCCH data is available for transmission, even though the WTRU 210 has DCCH/DTCH data in the buffer, rather than according to the actual value of the TEBS. This will allow the WTRU 210 to release the resources faster and therefore initiate the DCCH/DTCH data transmission faster.

Figure 11:
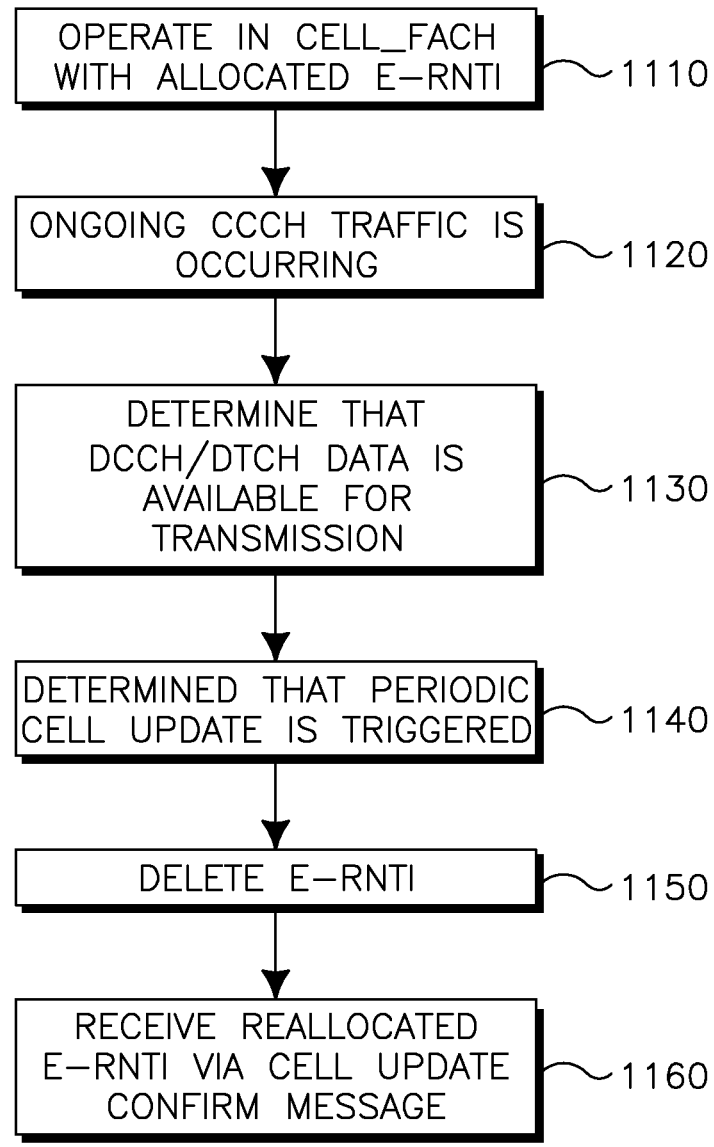
FIG. 11 shows a flow diagram of a WTRU restricting DCCH/DTCH data transmission until a cell update confirm message is received.

FIG. 11 shows a flow diagram of a WTRU 210 restricting DCCH/DTCH data transmission until a cell update confirm message is received. The WTRU 210 may be operating in the CELL_FACH state with an allocated E-RNTI (1110). The WTRU 210 may have ongoing CCCH data traffic (i.e. an allocated common E-DCH resource for CCCH traffic) (1120). The WTRU 210 determines that DCCH/DTCH data is available for transmission (1130). The WTRU 210 determines that a periodic cell update is triggered (1140). Once the periodic cell update is triggered, the WTRU 210 may not allow any transmission of DCCH/DTCH data until a cell update confirm message is received. To configure the WTRU 210 with such a restriction, the WTRU 210 may delete the E-RNTI on a condition that a periodic cell update is triggered (1150). This will restrict all subsequent DCCH/DTCH data from being configured. The WTRU 210 may receive a re-allocated E-RNTI via a cell update confirm message (1160).

Figure 12:
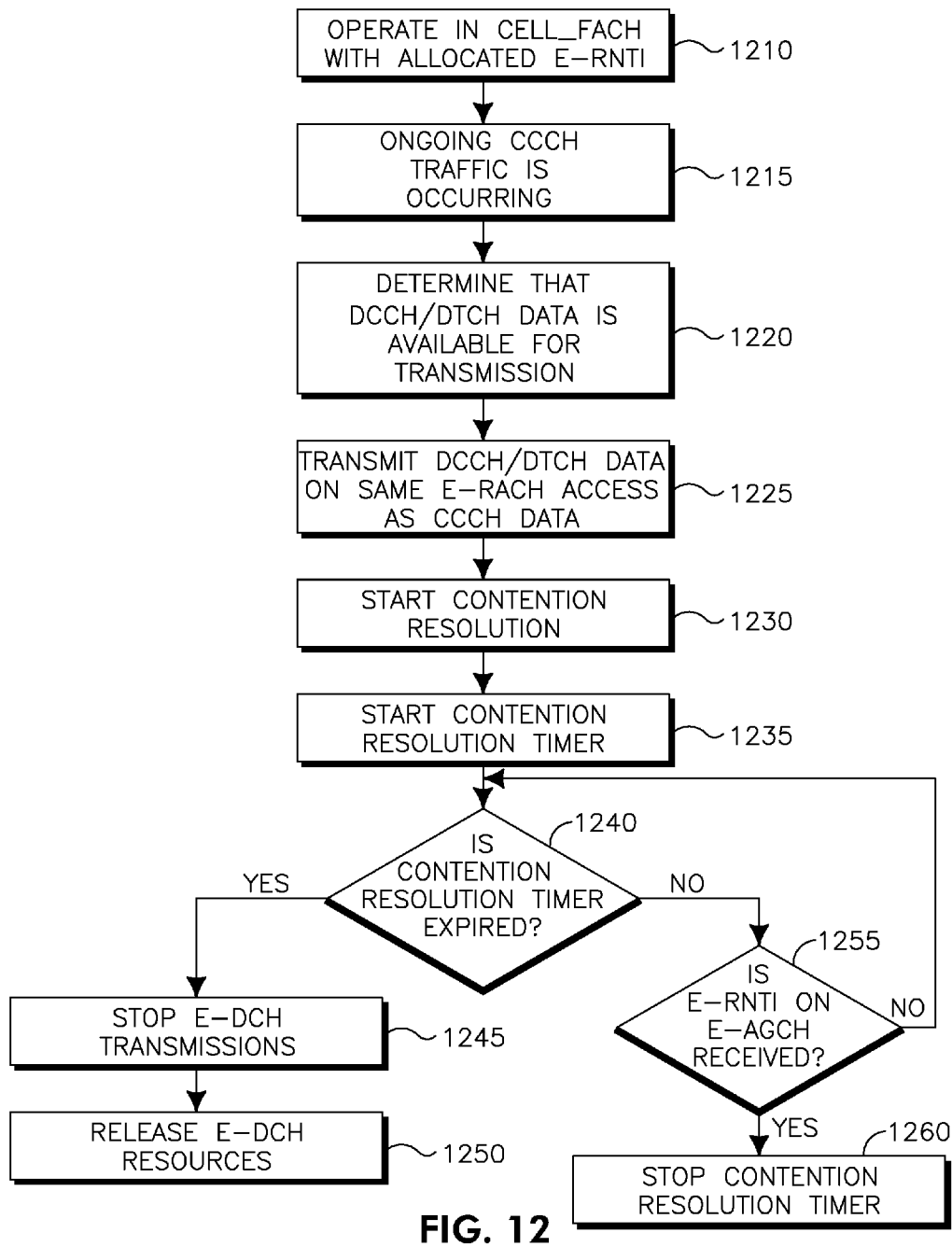
FIG. 12 shows a flow diagram of a WTRU that transmits DCCH/DTCH data on the same E-RACH access as ongoing CCCH transmission.

FIG. 12 shows a flow diagram of a WTRU 210 that transmits DCCH/DTCH data on the same E-RACH access as ongoing CCCH transmission. The WTRU 210 may be operating in the CELL_FACH state with an allocated E-RNTI (1210). The WTRU 210 may have ongoing CCCH data transmissions (i.e. an allocated common E-DCH resource for CCCH traffic) (1215). The WTRU 210 determines that DCCH/DTCH data becomes available for transmission (1220). Once DCCH/DTCH data becomes available for transmission, the WTRU 210 may start DCCH/DTCH transmission on the same E-RACH access, even if E-DCH resources have been allocated for CCCH (1225). The WTRU 210 may initiate a contention resolution phase immediately by appending its E-RNTI to the first MAC-i PDU (1230). The WTRU 210 may start a contention resolution timer upon transmission of the first MAC-i PDU containing its E-RNTI (1235). The WTRU 210 determines whether the contention resolution timer expires (1240). On a condition that the contention resolution timer expires, the WTRU 210 may stop E-DCH transmission (1245) and release the E-DCH resources (1250). On a condition that the contention resolution timer is not expired, the WTRU 210 determines whether it received its E-RNTI on an E-AGCH (1255). On a condition that the WTRU 210 received its E-RNTI on the E-AGCH, the WTRU 210 may stop the contention resolution timer (1260).

Figure 13:
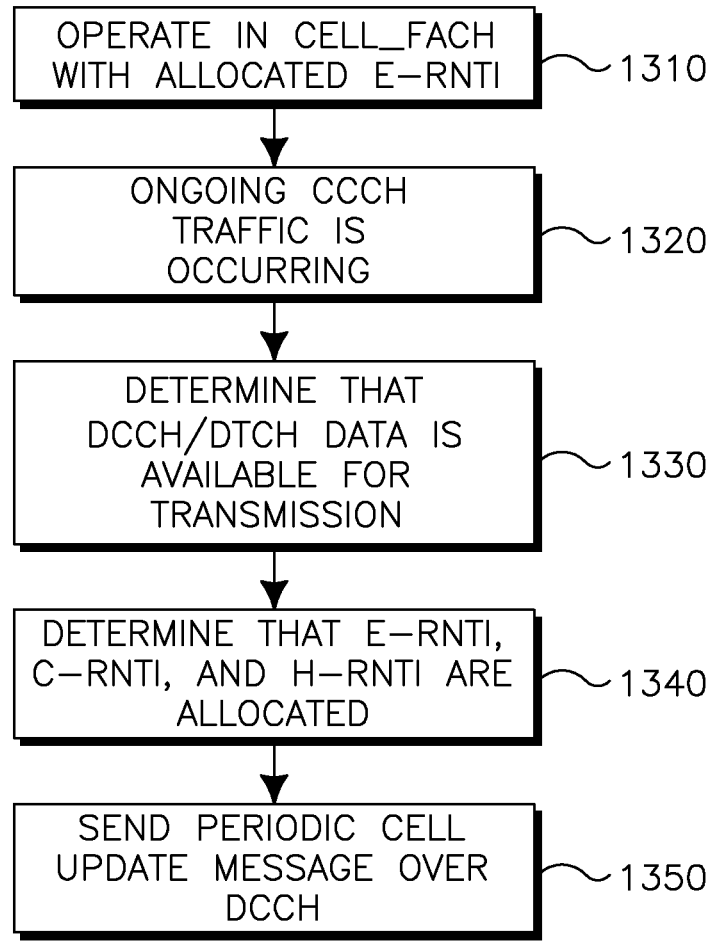
FIG. 13 shows a flow diagram of a WTRU that transmits a periodic cell update over the DCCH.

FIG. 13 shows a flow diagram of a WTRU 210 that transmits a periodic cell update over the DCCH. The WTRU 210 may be operating in the CELL_FACH state (1310). The WTRU 210 may have ongoing CCCH data traffic (i.e. an allocated common E-DCH resource for CCCH traffic) (1320). The WTRU 210 determines that DCCH/DTCH data is available for transmission (1330). On a condition that DCCH/DTCH data is available for transmission, the WTRU 210 determines that it has an allocated E-RNTI, cell RNTI (C-RNTI), and high speed downlink shared channel (HS-DSCH) RNTI (H-RNTI) (1340). The WTRU 210 may send a periodic cell update message over the DCCH (1350). On a condition that logical channel DCCH is used, the cell update message may be delivered directly to the serving radio network controller (SRNC) instead of the controlling radio network controller (CRNC). In order to allow DCCH transmission, the interface between the SRNC and CRNC is modified. More specifically, upon reception of the cell update signal, the SRNC sends it to the CRNC via the Iur interface.

Although features and elements are described above in particular combinations, each feature or element can be used alone without the other features and elements or in various combinations with or without other features and elements. The methods or flow charts provided herein may be implemented in a computer program, software, or firmware incorporated in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

A processor in association with software may be used to implement a radio frequency transceiver for use in a wireless transmit receive unit (WTRU), user equipment (UE), terminal, base station, radio network controller (RNC), or any host computer. The WTRU may be used in conjunction with modules, implemented in hardware and/or software, such as a camera, a video camera module, a videophone, a speakerphone, a vibration device, a speaker, a microphone, a television transceiver, a hands free headset, a keyboard, a Bluetooth® module, a frequency modulated (FM) radio unit, a liquid crystal display (LCD) display unit, an organic light-emitting diode (OLED) display unit, a digital music player, a media player, a video game player module, an Internet browser, and/or any wireless local area network (WLAN) or Ultra Wide Band (UWB) module.

What is claimed is:

1. A method for control of wireless communication signals implemented in a wireless transmit/receive unit (WTRU), the method comprising
    determining that a periodic cell update timer expires while the WTRU is operating in a CELL_FACH state;
    determining whether the WTRU has an allocated E-DCH resource at a time the periodic cell update timer expires; and
    in response to determining that the periodic cell update timer expires while the WTRU is operating in the CELL_FACH state and a determination that the WTRU has the allocated E-DCH resource at the time the periodic cell update timer expires, re-starting the periodic cell update timer, wherein the periodic cell update timer is re-started without performing a periodic cell update.

2. The method of claim 1, wherein the allocated E-DCH resource is a common E-DCH resource associated with dedicated control channel (DCCH)/dedicated traffic channel (DTCH) data.

3. The method of claim 1, wherein the periodic cell update is performed upon a determination that the WTRU has no allocated E-DCH resource at the time the periodic cell update timer expires.

4. The method of claim 3, wherein the periodic cell update comprises a common control channel (CCCH) transmission.

5. The method of claim 4, wherein no dedicated control channel (DCCH)/dedicated traffic channel (DTCH) transmissions are performed after the CCCH transmission.

6. The method of claim 5, wherein a DCCH/DTCH transmission may be initiated upon a determination that a CCCH resource is released.

7. The method of claim 6, wherein the CCCH resource is a common E-DCH resource for the CCCH transmission.

8. The method of claim 1, wherein the periodic cell update timer is a T305 timer.

9. The method of claim 1, wherein the WTRU is operating in the CELL_FACH state with an allocated enhanced dedicated channel (E-DCH) radio network temporary identifier (E-RNTI).

10. A wireless transmit/receive unit (WTRU) comprising:
    a receiver configured to receive an allocation of an enhanced dedicated channel (E-DCH) resource; and
    a processor configured to:
    determine that a periodic cell update timer expires while the WTRU operates in a CELL_FACH state;
    determine whether the WTRU has an allocated E-DCH resource at the time the periodic cell update timer expires; and
    wherein in response to the determination that the periodic cell update timer expires while the WTRU operates in the CELL_FACH state and a determination that the WTRU has the allocated E-DCH resource at the time the periodic cell update timer expires, the processor is further configured to re-start the periodic cell update timer, and wherein the periodic cell update timer is re-started without performing a periodic cell update.

11. The WTRU of claim 10, wherein the allocated E-DCH resource is a common E-DCH resource associated with dedicated control channel (DCCH)/dedicated traffic channel (DTCH) data.

12. The WTRU of claim 10, wherein the periodic cell update is performed upon a determination that the WTRU has no allocated E-DCH resource at the time the periodic cell update timer expires.

13. The WTRU of claim 12, wherein the periodic cell update comprises a common control channel (CCCH) transmission.

14. The WTRU of claim 13, wherein no dedicated control channel (DCCH)/dedicated traffic channel (DTCH) transmissions are performed after the CCCH transmission.

15. The WTRU of claim 14, wherein a DCCH/DTCH transmission may be initiated upon a determination that a CCCH resource is released.

16. The WTRU of claim 15, wherein the CCCH resource is a common E-DCH resource for the CCCH transmission.

17. The WTRU of claim 10, wherein the periodic cell update timer is a T305 timer.

18. The WTRU of claim 10, wherein the WTRU operates in the CELL_FACH state with an allocated enhanced dedicated channel (E-DCH) radio network temporary identifier (E-RNTI).

* * * * *